(12) United States Patent
Ahn

(10) Patent No.: US 8,702,138 B2
(45) Date of Patent: Apr. 22, 2014

(54) COLLISION ENERGY ABSORPTION STRUCTURE OF VEHICLE

(71) Applicant: Hyundai Motor Company, Seoul (KR)

(72) Inventor: Byeng Jik Ahn, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/706,208

(22) Filed: Dec. 5, 2012

(65) Prior Publication Data

US 2014/0015265 A1    Jan. 16, 2014

(30) Foreign Application Priority Data

Jul. 16, 2012 (KR) .................. 10-2012-0077395

(51) Int. Cl.
    *B60R 19/18* (2006.01)
(52) U.S. Cl.
    USPC .......................... 293/133; 293/120
(58) Field of Classification Search
    USPC .................. 293/102, 120, 132, 133
    See application file for complete search history.

(56) References Cited

U.S. PATENT DOCUMENTS

| 6,705,670 B2 * | 3/2004 | Forssell et al. ........... 296/187.09 |
| 7,188,877 B2 * | 3/2007 | Gonzalez et al. ............. 293/133 |
| 7,793,996 B2 | 9/2010 | Karlander |

FOREIGN PATENT DOCUMENTS

| JP | 2009-045948 | 3/2009 |
| KR | 10-2011-0023599 | 3/2011 |
| KR | 10-2011-0072901 A | 6/2011 |

* cited by examiner

*Primary Examiner* — Joseph Pape
*Assistant Examiner* — Dana Ivey
(74) *Attorney, Agent, or Firm* — Morgan, Lewis & Bockius LLP

(57) ABSTRACT

A collision energy absorption structure of a vehicle may include a bumper back beam that may be disposed in a traverse direction of the vehicle, a side member that may be disposed at a predetermined distance from the bumper back beam in a longitudinal direction of the vehicle, and a crush box, of which a first side protrudes in a front direction of the bumper back beam and of which a second side may be interposed between the bumper back beam and the side member.

7 Claims, 6 Drawing Sheets

COLLISION ENERGY ABSORPTION STRUCTURE OF VEHICLE

CROSS-REFERENCE TO RELATED APPLICATION

The present application claims priority to Korean Patent Application No. 10-2012-0077395 filed in the Korean Intellectual Property Office on Jul. 16, 2012, the entire contents of which is incorporated herein for all purposes by this reference.

BACKGROUND OF THE INVENTION

1. Field of the Invention

The present invention relates to a collision energy absorption structure of a vehicle that improves a collision energy absorption rate and overall stability of a vehicle by reducing bending of a side member.

2. Description of Related Art

Generally, a crush box is used to prevent damage to a vehicle through plastic deformation when a front side of a vehicle is collided at a low speed.

Further, the crush box is disposed at a front side or a rear side, and absorbs an impact that is generated when a vehicle is impacted with an obstacle to improve the stability of an occupant and minimize deformation of a vehicle body.

FIG. 1 is an overall top plan view of a collision energy absorption structure of a vehicle.

Referring to FIG. 1, a vehicle includes a bumper back beam 100, a crush box 120, and a side member 110, wherein the bumper back beam 100 is disposed at the front or the rear of a vehicle and the crush box 120 is interposed between the bumper back beam 100 and the side member 110.

The bumper back beam 100 collides with a barrier 102 of a front side of a vehicle first, wherein the impact energy that is applied to the bumper back beam 100 is absorbed by the crush box 120 to be transferred to the side member 110.

Meanwhile, as shown in the drawing, a central portion of the bumper back beam 100 has a convex shape in a front side of the vehicle body, both end sides thereof are bent in a rear side of the vehicle body, and therefore the central portion of the bumper back beam 100 collides with the barrier 102 before the front side of the vehicle collides.

Accordingly, the bumper back beam 100 of which the central portion thereof is impacted with the barrier 102 can bend the side member 110 in an outside direction, and therefore the deformation of the vehicle is increased and the collision energy absorption efficiency of the crush box 120 is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a collision energy absorption structure having advantages of reducing overall deformation of a side member of a vehicle and improving collision energy absorption efficiency of a crush box when a vehicle collides with an obstacle.

In an aspect of the present invention, a collision energy absorption structure of a vehicle may include a bumper back beam that is disposed in a traverse direction of the vehicle, a side member that is disposed at a predetermined distance from the bumper back beam in a longitudinal direction of the vehicle, and a crush box, of which a first side protrudes in a front direction of the bumper back beam and of which a second side is interposed between the bumper back beam and the side member.

Both distal end portions of the bumper back beam are bent in a rear direction of the vehicle, wherein a central portion of the bumper back beam is shaped convex in a front direction of the vehicle, and wherein the crush box is coupled to the both distal end portions of the bumper back beam.

A crush plate is connected to a rear end portion of the crush box and is mounted on the side member.

A box front end surface of the crush box that protrudes from a front side of the bumper back beam is positioned at a level that corresponds to a back beam front end surface that is convex at a central portion of the bumper back beam.

A penetrating groove is formed on the crush box and the bumper back beam penetrates the crush box through the penetrating groove and is coupled thereto.

The penetrating groove is opened in an upper direction of the crush box such that the bumper back beam is mounted downwards onto a lower surface of the crush box.

The crush box may include an outer member that is disposed in an outer side of the vehicle body, and an inner member that is connected to the outer member and is disposed in an inner side of the vehicle body, wherein an incision groove is respectively formed on the outer member and the inner member to form the penetrating groove.

The outer member and the inner member are disposed in front of the bumper back beam on a level that corresponds to a back beam front end surface that is convex at a central portion of the bumper back beam.

As described above, a collision energy absorption structure of a vehicle according to an exemplary embodiment of the present invention reduces overall deformation of a side member of a vehicle and improves collision energy absorption efficiency of a crush box when a vehicle collides with an obstacle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
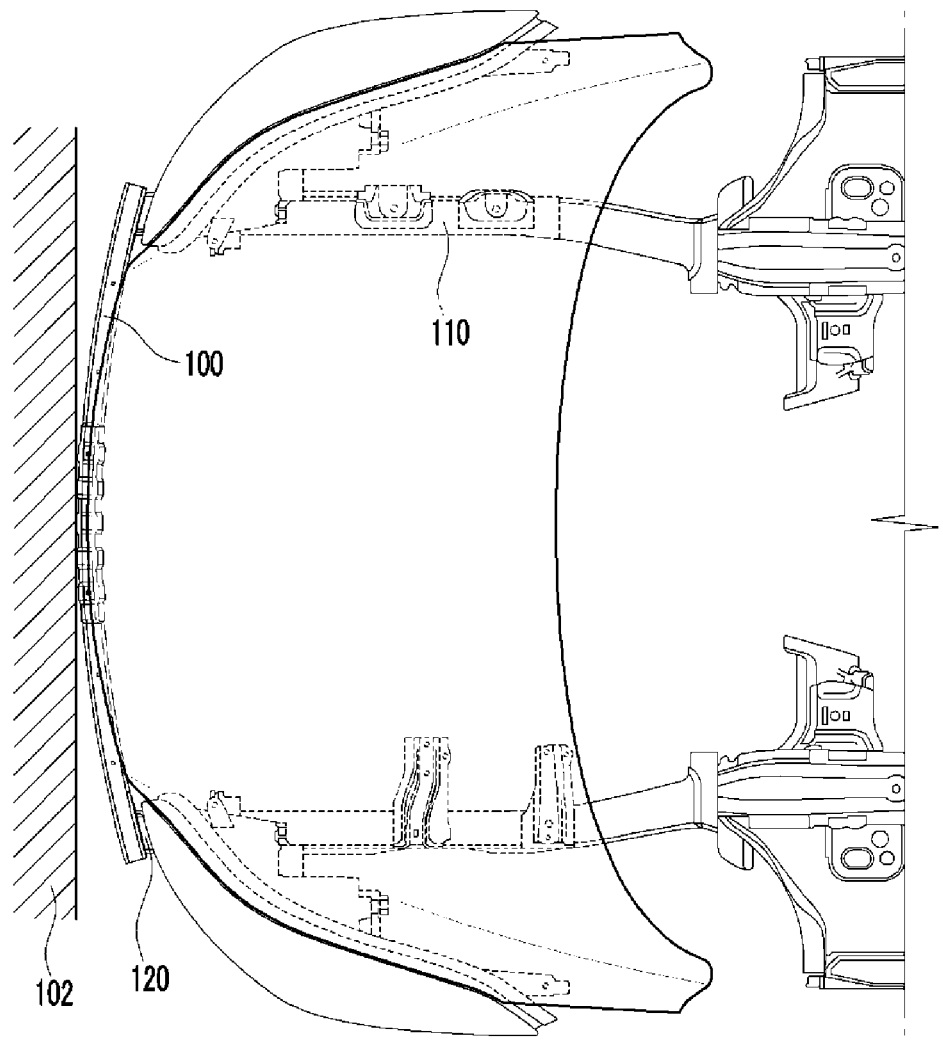
FIG. 1 is an overall top plan view of a collision energy absorption structure of a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
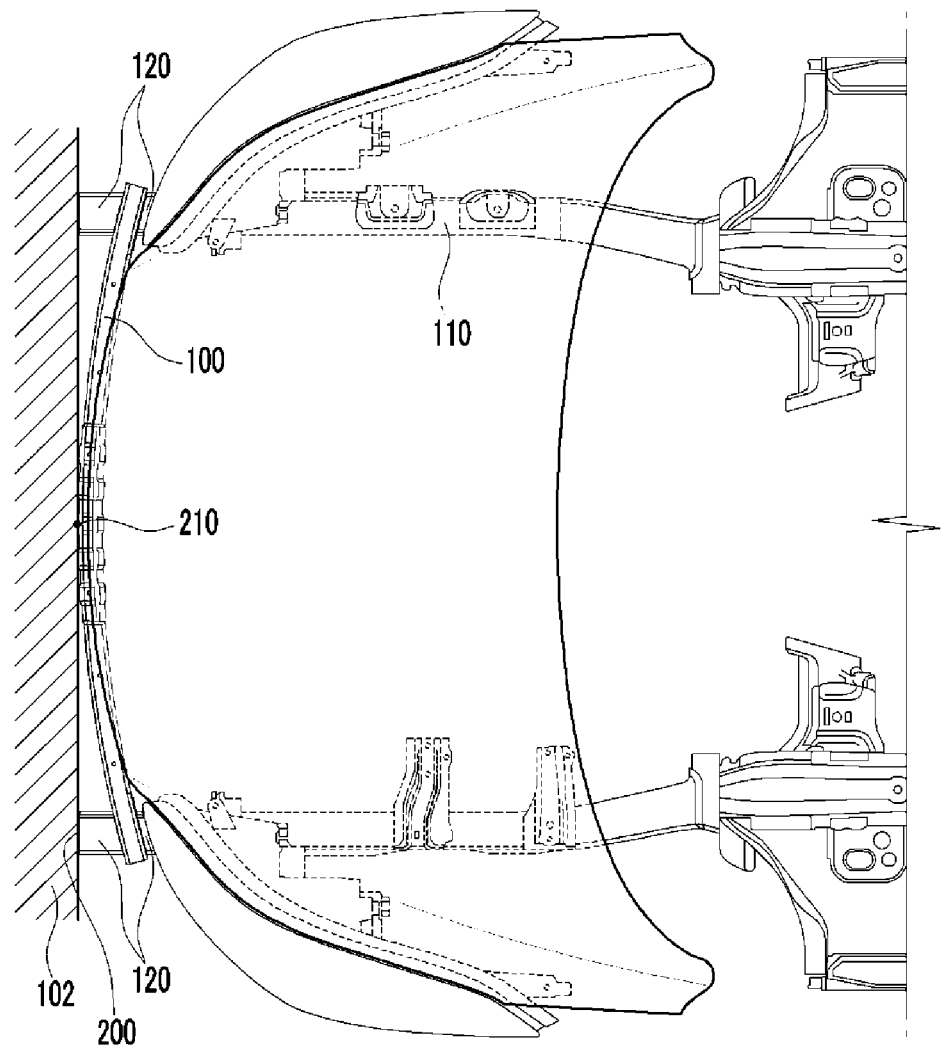
FIG. 2 is an overall top plan view of a collision energy absorption structure of a vehicle according to an exemplary embodiment of the present invention.

FIG. 2 is an overall top plan view of a collision energy absorption structure of a vehicle according to an exemplary embodiment of the present invention.

Referring to FIG. 2, a vehicle includes a bumper back beam 100, a crush box 120, and a side member 110, wherein the bumper back beam 100 is disposed at the front or the rear of the vehicle.

Further, the crush box 120 is interposed between the bumper back beam 100 and the side member 110, and the crush box 120 protrudes in a front side of the bumper back beam 100.

The barrier 102 simultaneously collides with a back beam front end surface 210 of the bumper back beam 100 and a box front end surface 200 of the crush box 120, and a part of the impact energy that is applied to the bumper back beam 100 and the crush box 120 is absorbed by the crush box 120 and the other part thereof is transferred to the side member 110.

As shown in the drawings, the central portion of the bumper back beam 100 is convex in a front side of the vehicle body and both end sides thereof are bent in a rear side of the vehicle body.

Further, the crush box 120 protrudes at both sides in a front side direction of the bumper back beam 100 to effectively absorb the impact energy of the barrier 102.

Accordingly, when the front side of the vehicle is collided, the bending or the opening of the side member 110 is prevented beforehand, and thus the deformation of the vehicle body is reduced and the collision energy absorption efficiency of the crush box 120 is improved.

Figure 3:
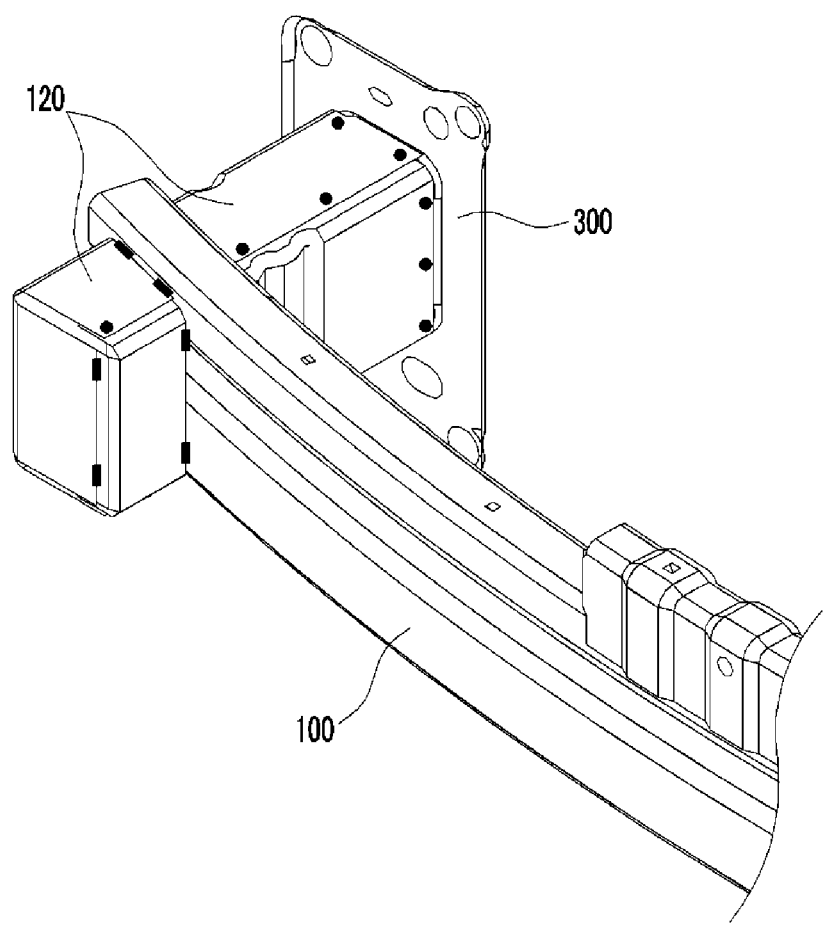
FIG. 3 is a partial perspective view of a collision energy absorption structure of a vehicle according to an exemplary embodiment of the present invention.

FIG. 3 is a partial perspective view of a collision energy absorption structure of a vehicle according to an exemplary embodiment of the present invention.

Referring to FIG. 3, both end sides of the bumper back beam 100 respectively penetrate the crush box 120, and the crush box 120 is welded to the bumper back beam 100.

A crush plate 300 is joined to the rear end portion of the crush box 120, and the crush plate 300 is fixed on the front end portion of the side member 110.

One side of the crush box 120 that is formed between the bumper back beam 100 and the crush plate 300 is integrally formed with the other side of the crush box 120 that protrudes in a front side direction of the bumper back beam 100.

Figure 4:
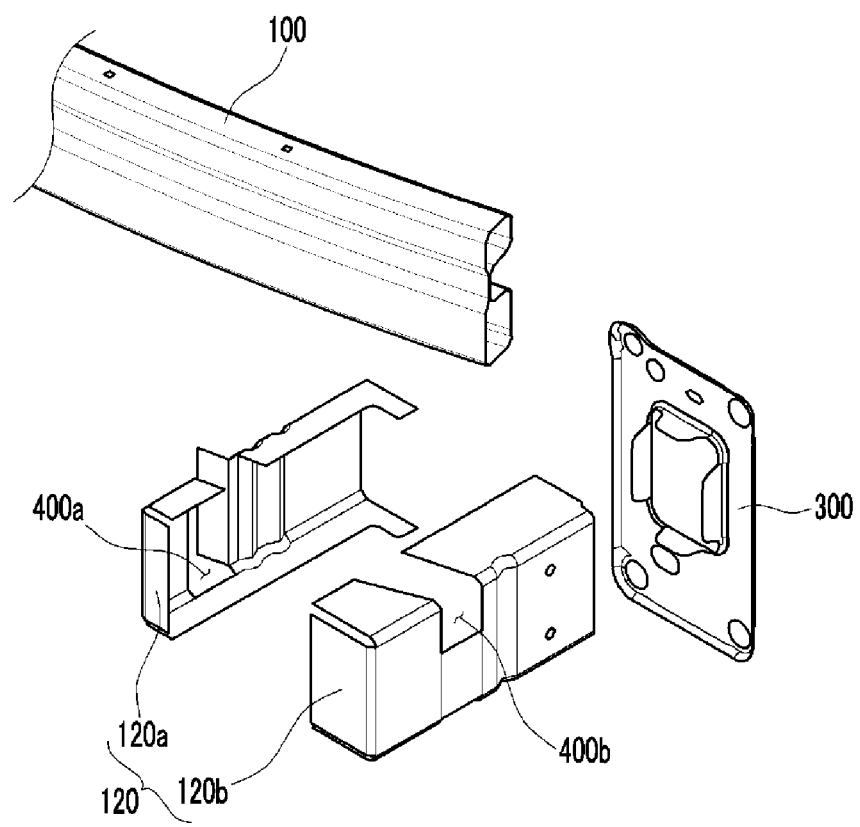
FIG. 4 is a partial exploded perspective view of a collision energy absorption structure of a vehicle according to an exemplary embodiment of the present invention.

FIG. 4 is a partial explode perspective view of a collision energy absorption structure of a vehicle according to an exemplary embodiment of the present invention.

Referring to FIG. 4, the crush box 120 includes an inner member 120a and an outer member 120b, the inner member 120a is disposed at an inner side of a vehicle body, the outer member 120b is disposed at an outer side of a vehicle body, and the inner member 120a is welded to the outer member 120b.

A first incision groove 400a that the bumper back beam 100 penetrates across is formed on the inner member 120a, and a second incision groove 400b that the bumper back beam 100 penetrates across is formed on the outer member 120b to correspond to the first incision groove 400a.

The inner member 120a is welded to the outer member 120b, and the first incision groove 400a and the second incision groove 400b form one penetrating groove 400a and 400b together. Further, the inner member 120a and the outer member 120b are simultaneously joined to the crush plate 300.

The bumper back beam 100 is moved downward to be securely assembled on the crush box 120 in an exemplary embodiment of the present invention. Further, a lower portion of the crush box 120 supports the bumper back beam 100 upward to secure the structure with which the bumper back beam 100 is engaged with the crush box 120.

Also, the height and the interior diameter of the penetrating groove 400a and 400b, the height and the interior diameter of the first incision groove 400a, and the height and the interior diameter of the second incision groove 400b can be varied according to the design specifications in an exemplary embodiment of the present invention.

Further, it is described that the bumper back beam 100 penetrates the crush box 120, but it can also be described that the crush box 120 penetrates the bumper back beam 100 in an exemplary embodiment of the present invention.

Figure 5:
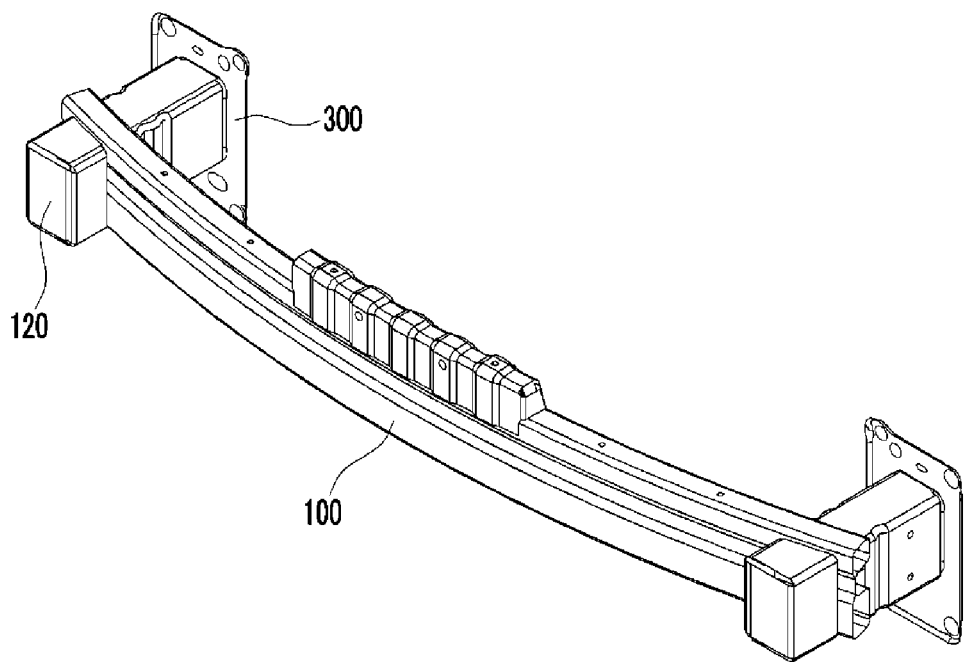
FIG. 5 is a perspective view of a collision energy absorption structure of a vehicle according to an exemplary embodiment of the present invention.

FIG. 5 is a perspective view of a collision energy absorption structure of a vehicle according to an exemplary embodiment of the present invention.

The inner member 120a, the outer member 120b, the crush plate 300, and the bumper back beam 100 as constituent elements of FIG. 4 are all joined to complete the assembled product as shown in FIG. 5. Further, the assembled product is connected to a vehicle body by mounting the crush plate 300 on a front end portion of the side member 110.

Figure 6:
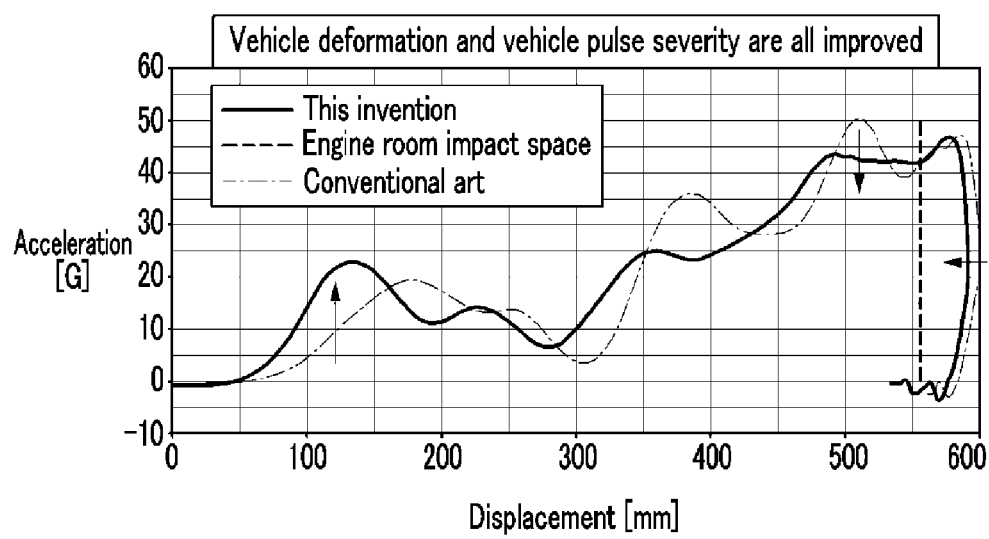
FIG. 6 is a graph showing effectiveness of a collision energy absorption structure of a vehicle according to an exemplary embodiment of the present invention.

FIG. 6 is a graph showing effectiveness of a collision energy absorption structure of a vehicle according to an exemplary embodiment of the present invention.

Referring to FIG. 6, while a vehicle is collided, the former stage acceleration is increased and the latter stage acceleration is reduced rather than as in a conventional case, and the impact acceleration becomes uniform, and this result signifies that the impact energy is uniformly absorbed during the collision.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A collision energy absorption structure of a vehicle, comprising:
   a bumper back beam that is disposed in a traverse direction of the vehicle;
   a side member that is disposed at a predetermined distance from the bumper back beam in a longitudinal direction of the vehicle; and
   a crush box, of which a front side protrudes in a front direction of the bumper back beam with respect to the vehicle and of which a rear side is interposed between the bumper back beam and the side member;
   wherein the crush box includes a penetrating groove; and
   wherein the bumper back beam penetrates the crush box through the penetrating groove and is coupled thereto.

2. The collision energy absorption structure of claim 1, wherein the bumper back beam are shaped bent in a rear direction of the vehicle such that a middle portion of the bumper back beam protrudes in a front direction of the vehicle.

3. The collision energy absorption structure of claim 2, wherein a crush plate connected to a rear end portion of the crush box is connected to the side member.

4. The collision energy absorption structure of claim 2, wherein a front end surface of the crush box that protrudes from a front side of the bumper back beam is positioned in a single plane that a front end surface of the middle portion in the bumper back beam is positioned.

5. The collision energy absorption structure of claim 1, wherein the penetrating groove opens in an upper direction of the crush box such that the bumper back beam is mounted downwards onto a lower surface of the crush box.

6. The collision energy absorption structure of claim 1, wherein the crush box includes:
   an outer member that is disposed in an outer side of a vehicle body; and
   an inner member that is connected to the outer member and is disposed in an inner side of the vehicle body,
   wherein an incision groove is respectively formed on the outer member and the inner member to form the penetrating groove.

7. The collision energy absorption structure of claim 6, wherein the outer member and the inner member are disposed in a single plane that a front end surface of a middle portion in the bumper back beam is positioned.

* * * * *